United States Patent Office 3,702,283
Patented Nov. 7, 1972

---

3,702,283
PROCESS FOR IMPROVING THE FOOD VALUE OF MICROORGANISMS OBTAINED BY CULTURE ON HYDROCARBON SUBSTRATES
Claude Gatellier, Boulogne, and Georges Gilkmans, Meudon la Foret, France, assignors to Institut Francais du Petrole des Carburants et Lubrifiants, Rueil Malmaison, France
No Drawing. Filed Aug. 24, 1970, Ser. No. 66,561
Claims priority, application France, Sept. 2, 1969, 6929980
Int. Cl. C12b 1/00
U.S. Cl. 195—28 R    5 Claims

ABSTRACT OF THE DISCLOSURE

Microorganisms, for example yeasts, grown on hydrocarbon substrates have a high content of nucleic acids, which makes their use in food objectionable. This invention obviates this problem by providing a process according to which a microorganism previously grown on a hydrocarbon substrate is contacted with oxygen and a multiplication inhibitor specifically carbon dioxide, thereby stopping the multiplication while maintaining substantially unchanged the other life functions of the microorganism cells.

---

The use of microorganisms in food has been known for a long time. Yeasts have been used in food for many decades particularly in food for animals.

However, for human food the use of microorganisms in the form of killed and dried cells which no longer exhibit diastasic properties, has not been universally accepted up to now, since these cells have a higher content of nucleic acids than conventional food.

For example, yeast has a nucleic acid content of 4.8%, while beef meat contains only 0.9% thereof as an average. Other types of bacteria may have a nucleic acid content up to 15% with respect to the weight of the dry cells.

The high nucleic acids content of microorganisms growing in a synthetic medium containing hydrocarbons as carbon source results from ribonucleic acid, hereafter referred to as RNA which acts in the proteins synthesis, and also from desoxyribonucleic acid, hereafter referred to as DNA, which has a lesser importance.

It is known that the rate of growth of a microorganism is approximately proportional to the average RNA content of the cell; however, no industrial process has been proposed up to now, which provides for the reduction of the nucleic acids content of microorganisms to be used as food and which have been previously grown in a fermentation vessel on various carbon substrates of petroleum origin.

It is known however, that by human ingestion the nucleic acids of food are transformed under the influence of the various digestion juices, and that uric acid which is an intermediate substance in the nucleic acids catabolism, is responsible for serious diseases of the articulations, for example the gout.

This invention is based on the following unexpected observation: when a microorganism is maintained in a stirred aqueous inorganic medium of suitable composition contained in a reaction vessel, in the presence of an oxygen-containing gas, there is obtained a substantial reduction of the average nucleic acids content of the cell, while the essential life functions of the microorganism cell are retained. These life functions are all maintained except those which produce the cells division. This invention may be performed with the simultaneous partial or total consumption of the hydrocarbons and the by-products of a prior growing step.

The process of this invention follows a microorganism growing step, resulting from contacting an inoculum with a petroleum feed charge, an aqueous nutritive medium and oxygen, for example the growing step of the French patent application No. 151,959 filed May 15, 1968 (U.S. patent application No. 824,256).

The process of this invention consists of recovering microorganisms produced in a growing step, by any known technique, for example settling or centrifuging, and performing a so-called maturation step consisting of contacting said microorganisms with an inorganic aqueous solution containing a chemical growth inhibitor and with oxygen.

By growth, there is meant the cells multiplication by cissiparity or sprouting. The inhibitor which will be hereinafter defined impedes the growth during the maturation step. The hydrocarbons or the hydrocarbon oxidation products which may have been introduced with the microorganisms from the growing step are not detrimental since they are consumed at least in part during the invention.

Although various substances were known to inhibit cell multiplication, it had not been possible, up to now, to reduce the nucleic acids content of the microorganisms since extra special experimental conditions had been used for these inhibition studies: the cells were carefully washed and maintained in a physiological salt solution.

It is thus quite unexpected that, using unwashed cells contained in a reactor, it is now possible to achieve a substantial decrease of the nucleic acids content while retaining the essential life functions of the cell. It has been also observed that, when using again the conventional operating conditions, i.e., when washing the cells before contacting them with the inhibitor, no reduction of the nucleic acids content was observed.

According to a first embodiment of this invention, the inhibitor is an antibiotic, for example, mitomycin C or an actinomycin.

It may be desirable to determine the minimal active dose of these antibiotics, which are used as inhibitors of the nucleic acids metabolism, by adding them to cultures of the microorganism whose production as food is desired, these cultures being in exponential phase of growth, so that only RNA synthesis be inhibited.

An aqueous solution of the selected inhibitor is used to impregnate a paper disc which is placed on a Petri box which has previously been seeded with a proliferating microorganism suspension. From the diameter of the area of inhibited growth, one can deduce the minimal active dose for the microorganisms. This minimal concentration has been determined, for example, for cycloheximidine as antibiotic and *Candida lipolytica* as yeast. *Candida lipolytica* in exponential phase of growth on $C_{10}$–$C_{15}$ normal paraffins has been admixed with a physiological salt solution and one drop of the resulting suspension has been poured onto a Petri box (solid inorganic medium with hexadecane) so that the growth was obtained in an oven at 28° C. Several Petri boxes inoculated in the same manner have received, at their center, a paper disc impregnated with a drop of a cycloheximidine solution so that increasing concentrations of inhibitor in the solid medium were obtained. The growth of *Candida lipolytica* was found to be inhibited at concentrations between 10 and 100 micrograms per liter as determined with respect to the volume of the inhibited zones. With chloramphenicol as antibiotic and *Psuedomonas fluorescens* as yeast, the growth was stopped at concentrations of 5 to 10 micrograms of chloramphenicol per liter.

According to this invention, the growth may be inhibited with any known antibiotic provided it does not inhibit the breathing activity of the microorganism cells, said inhibition being obtained when the antibiotic amount exceeds a so-called maximal value.

Indeed, certain antibiotics such as mitomycin C are quite selective, so that there is practically no upper limit for them. In other words, with these antibiotics used in any amount higher than the minimal amount, the growth is stopped but the other life functions are retained.

On the contrary, with less selective antibiotics, for example chloramphenicol, the amount of antibiotic has to be selected between an upper and a lower limit.

The upper limit may be easily determined by means of a Warburg apparatus for breathing measurements. A suspension of a microorganism in exponential phase of growth in a physiological salt solution is used to inoculate the flasks of the apparatus previously filled up with a buffer medium and an n-paraffin. Some of the flasks are used as blanks and the others receive the inhibitor in increasing amounts. The oxidation rate of the carbon substrate, which makes itself apparent by the rate at which oxygen is consumed, decreases substantially at a concentration of the inhibitor which is the maximal. Thus, when the antibiotic is cycloheximidine and the yeast is *Candida lipolytica,* the following oxygen consumptions are observed:

| Flasks: | Hourly oxygen consumption (microliter per mg. of cells-dry weight) |
|---|---|
| Blank | 80 |
| 10 μg. inhibitor per liter | 80 |
| 100 μg. inhibitor per liter | 80 |
| 1000 μg. inhibitor per liter | 80 |
| 5000 μg. inhibitor per liter | 25 |

Thus the maximal concentration is about 5000 μg. per liter.

With chloramphenicol and *Pseudomonos fluorescens,* the following consumptions are observed:

| Flasks: | Hourly oxygen consumption (microliters per mg. of cells-dry weight) |
|---|---|
| Blank | 100 |
| 5 μg. inhibitor per liter | 100 |
| 50 μg. inhibitor per liter | 95 |
| 500 μg. inhibitor per liter | 10 |

Thus the maximal concentration which inhibits the growth is about 500 μg./l.

By way of examples of useful antibiotics, the following will be mentioned: chloramphenicol, cycloheximide and the tetracyclines.

According to another object of this invention, the chemical inhibitor is an aminoacid analog, the dose of which has to be determined in the same manner as that used with the antibiotics (minimal and, if necessary, maximal amounts). The following may be used, for example: 5 - methyl - tryptophane which is an analog of L-tryptophane; para-fluoro-phenyl-alanine which is an analog of L-phenylalanine; ethionine which is an analog of L-methionine.

According to another aspect of this invention, this product is an analog of the purine and pyrimidine bases, for example 8-azaguanine and malonyl-urea.

The usual concentrations of antibiotics, analogs of aminoacids and analogs of purine and pyrimidine bases may range between 1 and 1,000 micrograms per liter.

According to a fourth embodiment, the inhibitor is carbon dioxide which may be used in admixture with the oxygen necessary to the metabolism of the microorganisms. at least one part thereof dissolves in the aqueous phase. There is used, for example, air containing 0.5–2% and preferably 0.6–1% by volume of $CO_2$.

Two or more inhibitors may be used, which may be selected from the hereinbefore disclosed types.

According to this invention, the effect of the chemical inhibitor may be increased by using a particular salt composition of the aqueous inorganic phase, in order to stop the growth of the microorganisms, i.e. their multiplication, while maintaining the mechanisms of intra-cellular conversion unmodified.

The aqueous nutritive phase is a solution containing at least one inorganic nitrogen source, for example ammonium sulfate or sodium nitrate, or one organic nitrogen source, for example urea. It also contains an inorganic phosphorus source, for example sodium phosphate or ammonium phosphate, as well as other essential elements.

The aqueous maturation medium differs from the aqueous growth medium in that it is free of at least one of the other essential elements, i.e. the growth factors (compounds of the vitamin-B type), oligoelements such as iron and cobalt and essential ions, for example magnesium and potassium. The aqueous maturation phase preferably contains only the nitrogen and phosphorus sources with at least one growth inhibitor.

This invention applies to all microorganisms, either pure or in admixture, obtained by growth on hydrocarbon fractions of petroleum origin, particularly those fractions which contain at least 70% and preferably at least 85% of at least one linear unbranched paraffinic hydrocarbon.

This invention also applies to all microorganisms, either pure or in admixture, which can be grown on petroleum gases such as methane, ethane, propane or a $C_4$ cut.

These microorganisms may be, for example, yeasts, molds or bacteria. By way of examples, the following may be mentioned:

(a) Amongst the yeasts

The family of Endomycetaceae and more particularly the sub-family of Saccharomycetoideae to which pertain the genera Pichia, Hansenula, Debaryomyces, the sub-family of Lipomycetoideae and particularly the Lipomyces genus.

The family of Cryptococcaceae, more particularly the sub-family of Cryptococcoideae comprising Torulopsis and Candida genera and the sub-family of Rhodotoruloideae comprising the Rhodotorula genus.

(b) Amongst the bacteria

The order of Pseudomonadales, particularly the Pseudomonadaceae comprising the Pseudomonas genus including the following species:

*Pseudomonas fluorescens*
*Pseudomonas ovalis*
*Pseudomonas cruciviae*

The order of Eubacteriales comprising the Achromobacteraceae family and particularly the Achromobacter genus, the Flavobacterium genus including the species of:

*Flavobacterium aquatile*
*Flavobacterium lutescens*
*Flavobacterium marinum* the Micrococcaceae family, particularly the species *Micrococcus luteus* and *Micrococcus flavus,* the Brevibacteriaceae family including the Brevibacterium genus.

The order of Actinomycetales including the Mycobacteriaceae and the actinomycetaceae families.

(c) Amongst the molds

The Mucoraceae family including the Rhizopus genus,
The Aspergillales family including the Aspergillus and Penicillium generi.

The operating conditions of the maturation step are substantially identical to those of the growing step, the latter being well-known in the art.

The maturation temperature may be selected between 20 and 40° C. and preferably between 27 and 33° C. The pH may be selected from 2 to 6, preferably from 3 to 4. The content of nitrogen compound, for example ammonium sulfate, of the aqueous phase usually ranges from 0.01 to 60 grams per liter, preferably 1 to 20 grams per liter.

Any known phosphorus source may be used, provided it is soluble and assimilable by the microorganisms.

The phosphorus content of the aqueous solution, expressed as $PO_4^{3-}$, is usually from 0.5 to 20 grams per liter of aqueous phase.

The following examples are given for illustration purposes.

EXAMPLE 1

A *Candida lipolytica* yeast of the *Endomycopsis lipolytica* type is cultivated in a continuous manner, while maintaining growth limitation conditions, the limiting factor being the petroleum cut having a high content of $C_{11}$–$C_{18}$ normal paraffins (main substrate).

This culture is carried out in a stirred cylindrical reactor of 1 cubic meter capacity; air is blown at a rate of 100 cm. per hour; the pressure being 2.5 atm. and the temperature 30° C.±1° C.

The used hydrocarbon cut is obtained by dewaxing a gas-oil cut by means of urea; it consists of 90% of normal paraffins and 10% of a mixture of branched paraffins, naphthenes and aromatics. It is introduced into the reaction vessel at a rate of 1 kg. per hour, together with an inorganic solution (about 150 liters per hour) providing 40 g. of phosphorus ($P_2O_5$), 35 g. of potassium ($K_2O$) and 1 g. of magnesium (MgO) per hour, these elements being supplied as potassium phosphate and magnesium chloride. The pH is maintained at 4±0.1 by means of ammonia used at a rate corresponding to 100 g. of nitrogen (N) per hour. The inorganic solution contains the other salts necessary for growth in sufficient amounts.

The effluent from the reactor gives per hour 1.5 kg. of yeast (dry weight) and 150 liters of an inorganic solution containing 5 g. of phosphorus ($P_2O_5$) (however it practically no longer contains potassium or magnesium), together with 0.1 kg. per hour of hydrocarbons. Analysis of the raw cells is as follows:

Nitrogen (Kjeldahl): 9.2%
Nucleic nitrogen (calculated with respect to the Kjeldahl nitrogen): 10.3%

The effluent is continuously passed to a second reactor at 30° C.±1° C., the latter being fed with fresh air from a blower. The pH is maintained at 4.5±0.2 by means of ammonia. Mitomycin C is present at a constant concentration of 10 micrograms per liter.

The effluent of this second reactor contains 1.6 kg. per hour of yeast (dry weight) and 150 liters per hour of an inorganic solution; paraffins are no longer present.

After centrifugation, washing and drying, there are obtained yeasts the analysis of which gives:

Nitrogen (Kjeldahl): 10.1%
Nucleic nitrogen (with respect to the nitrogen Kjeldahl): 5%

EXAMPLE 2

Example 1 is repeated except that mitomycin C is substituted with parafluorophenylalanine at a concentration of 2 µg. per liter.

The resulting yeasts have the following composition:

Nitrogen (Kjeldahl): 9.3%
Nucleic nitrogen (with respect to the nitrogen Kjeldahl): 3.5%

EXAMPLE 3

Example 1 is repeated except that the effluent from the first reactor is centrifuged to concentrate the cream. The resulting cream gives 1.5 kg. of yeasts and 8 liters of inorganic solution per hour. The cream is conveyed to the second reactor containing mitomycin C, the conditions being those of Example 1. There is thus obtained 1.6 kg. of yeast per hour, the analysis of which gives:

Nitrogen (Kjeldahl): 9.9%
Nucleic nitrogen (with respect to the nitrogen Kjeldahl): 6%

EXAMPLE 3A

Example 3 is repeated, except that the cream recovered by centrifugation is passed to a second centrifugation vessel in which the cream is counter-currently washed with water. The cells are thus washed and contain neither inorganic salts nor phosphorus and nitrogen sources; they are in complete rest. They are passed to the second reactor of Example 3 and treated therein just as described in Example 3 in the presence of mitomycin C, except that the pH is not controlled with ammonia to avoid any introduction of nitrogen. The analysis of the cells is as follows:

Nitrogen (Kjeldahl): 9.7%
Nucleic nitrogen (with respect to the nitrogen Kjeldahl): 10.3%

No reduction of the nucleic acids content is observed.

EXAMPLES 4 TO 8

Example 1 is repeated, except that mitomycin C is substituted with chloramphenicol, cycloheximide, 5-methyl tryptophane, 8-azaguanine and carbon dioxide.

The results were substantially the same as before.

What we claim is:

1. A process for reducing the nucleic acids content of microorganisms produced on a hydrocarbon substrate in a prior step of culture during which the microorganisms have been multiplied, comprising contacting the microorganisms with a molecular oxygen-containing gas and with an aqueous medium containing as at least one inhibitor carbon dioxide in an amount effective to stop the multiplication while maintaining substantially unchanged the other life functions of the microorganism cells, said aqueous medium also containing at least one nitrogen source and at least one phosphorus source but free of at least one element selected from the group consisting of the growth factors, the oligo-elements and the essential ions, said microorganisms not being washed prior to contacting same with said inhibitor.

2. The process of claim 1 wherein said molecular oxygen is in the form of air containing 0.5–2% by volume $CO_2$.

3. The process of claim 1 wherein said molecular oxygen is in the form of air containing 0.6–1% by volume $CO_2$.

4. The process of claim 1 wherein the aqueous medium contains only a nitrogen source, a phosphorus source and the $CO_2$.

5. The process of claim 1 wherein the microorganisms are selected from the group consisting of yeasts and bacteria.

References Cited

UNITED STATES PATENTS

| | | | |
|---|---|---|---|
| 3,359,177 | 12/1967 | Nara et al. | 195—28 N |
| 3,243,354 | 3/1966 | Naka et al. | 195—28 N |
| 3,139,385 | 6/1964 | Ogata et al. | 195—28 N |

A. LOUIS MONACELL, Primary Examiner

J. M. HUNTER, Assistant Examiner

U.S. Cl. X.R.

195—1; 99—14